United States Patent
Ben Dayan et al.

(10) Patent No.: US 11,340,823 B2
(45) Date of Patent: May 24, 2022

(54) AUTHENTICATED STATELESS MOUNT STRING FOR A DISTRIBUTED FILE SYSTEM

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL)

(73) Assignee: Weka.IO Ltd.

( * ) Notice: Subject to any disclaimer, the term of this patent is extended or adjusted under 35 U.S.C. 154(b) by 605 days.

(21) Appl. No.: 16/293,870

(22) Filed: Mar. 6, 2019

(65) Prior Publication Data
US 2020/0057566 A1 Feb. 20, 2020

Related U.S. Application Data

(60) Provisional application No. 62/719,916, filed on Aug. 20, 2018.

(51) Int. Cl.
G06F 3/00 (2006.01)
G06F 3/06 (2006.01)
G06F 9/455 (2018.01)

(52) U.S. Cl.
CPC .............. *G06F 3/065* (2013.01); *G06F 3/064* (2013.01); *G06F 3/067* (2013.01); *G06F 3/0619* (2013.01); *G06F 3/0688* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 6,487,636 B1 | 11/2002 | Dolphin et al. | |
| 7,447,839 B2 | 11/2008 | Uppala | |
| 7,681,072 B1 | 3/2010 | Gibson et al. | |
| 7,793,146 B1 | 9/2010 | Gibson et al. | |
| 8,645,749 B2 | 2/2014 | Reche | |
| 8,918,478 B2 | 12/2014 | Ozzie et al. | |
| 9,087,012 B1 | 7/2015 | Hayes et al. | |
| 9,448,887 B1 | 9/2016 | Ben Dayan et al. | |
| 10,817,392 B1 * | 10/2020 | McAuliffe | G06F 11/1461 |

(Continued)

OTHER PUBLICATIONS

K. J. L. Kumar, "Implementing Network File System Protocol for Highly Available Clustered Applications on Network Attached Storage," 2013 5th International Conference and Computational Intelligence and Communication Networks, 2013, pp. 496-499, doi: 10.1109/CICN.2013.108. (Year: 2013).*

(Continued)

*Primary Examiner* — Daniel F. McMahon
(74) *Attorney, Agent, or Firm* — McAndrews, Held & Malloy, Ltd.

(57) ABSTRACT

A cluster of one or more computing devices is operably coupled to a plurality of storage devices. Each computing device in the cluster comprises a frontend and a backend. The backend comprises a plurality of buckets. Each bucket is operable to build a failure-protected stipe that spans two or more of the plurality of the storage devices. A file system comprises one or more failure-protected stipes. A client other than the one or more computing devices in the cluster is operable to access at least a portion of the file system via a stateless mount string comprising a cryptographically-signed key.

20 Claims, 7 Drawing Sheets

(56) References Cited

U.S. PATENT DOCUMENTS

| | | | |
|---|---|---|---|
| 2005/0114726 | A1 | 5/2005 | Ouchi |
| 2008/0046404 | A1 | 2/2008 | Bone et al. |
| 2010/0199125 | A1 | 8/2010 | Reche |
| 2011/0313973 | A1 | 12/2011 | Srivas et al. |
| 2014/0143535 | A1 | 5/2014 | Russell et al. |
| 2015/0355971 | A1 | 12/2015 | Becker-Szendy et al. |
| 2016/0246677 | A1 | 8/2016 | Sangamkar et al. |
| 2017/0052847 | A1 | 2/2017 | Ben Dayan et al. |
| 2020/0401350 | A1* | 12/2020 | Kannan ................. G06F 3/0659 |
| 2021/0055885 | A1* | 2/2021 | Strathman ............. G06F 3/0604 |

OTHER PUBLICATIONS

Int'l Search Report and Written Opinion Appln No. PCT/IB2016/001177 dated Dec. 2, 2016.
Int'l Preliminary Report on Patentability Appln No. PCT/IB2019/000733 dated Mar. 4, 2021.
Int'l Search Report and Written Opinion Appln No. PCT/IB2019/000733 dated May 19, 2020.
Krzyzanowski. "Distributed File Systems Design." Sep. 14, 2012 (Sep. 14, 2012) Retrieved on Apr. 20, 2020 (Apr. 20, 2020) from <https:llwww.cs.rutgers.edu/-pxk!417/notes/15-nas.html> entire document.

* cited by examiner

AUTHENTICATED STATELESS MOUNT STRING FOR A DISTRIBUTED FILE SYSTEM

PRIORITY CLAIM

This application claims priority to the following application, which is hereby incorporated herein by reference:

U.S. provisional patent application 62/719,916 titled "AUTHENTICATED STATELESS MOUNT STRING FOR A DISTRIBUTED FILE SYSTEM" filed on Aug. 20, 2018.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File system" is hereby incorporated herein by reference in its entirety.

BRIEF SUMMARY

Methods and systems are provided for an authenticated stateless mount string in a distributed file system substantially as illustrated by and/or described in connection with at least one of the figures, as set forth more completely in the claims.

DETAILED DESCRIPTION

Traditionally, file systems use a centralized control over the metadata structure (e.g., directories, files, attributes, file contents). If a local file system is accessible from a single server and that server fails, the file system's data may be lost if as there is no further protection. To add protection, some file systems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB blocks and 128 MB chunks. Extents may be stored in volatile memory, e.g., RAM for fast access, backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the file system's namespace, this load can be distributed across a plurality of nodes.

Figure 1:
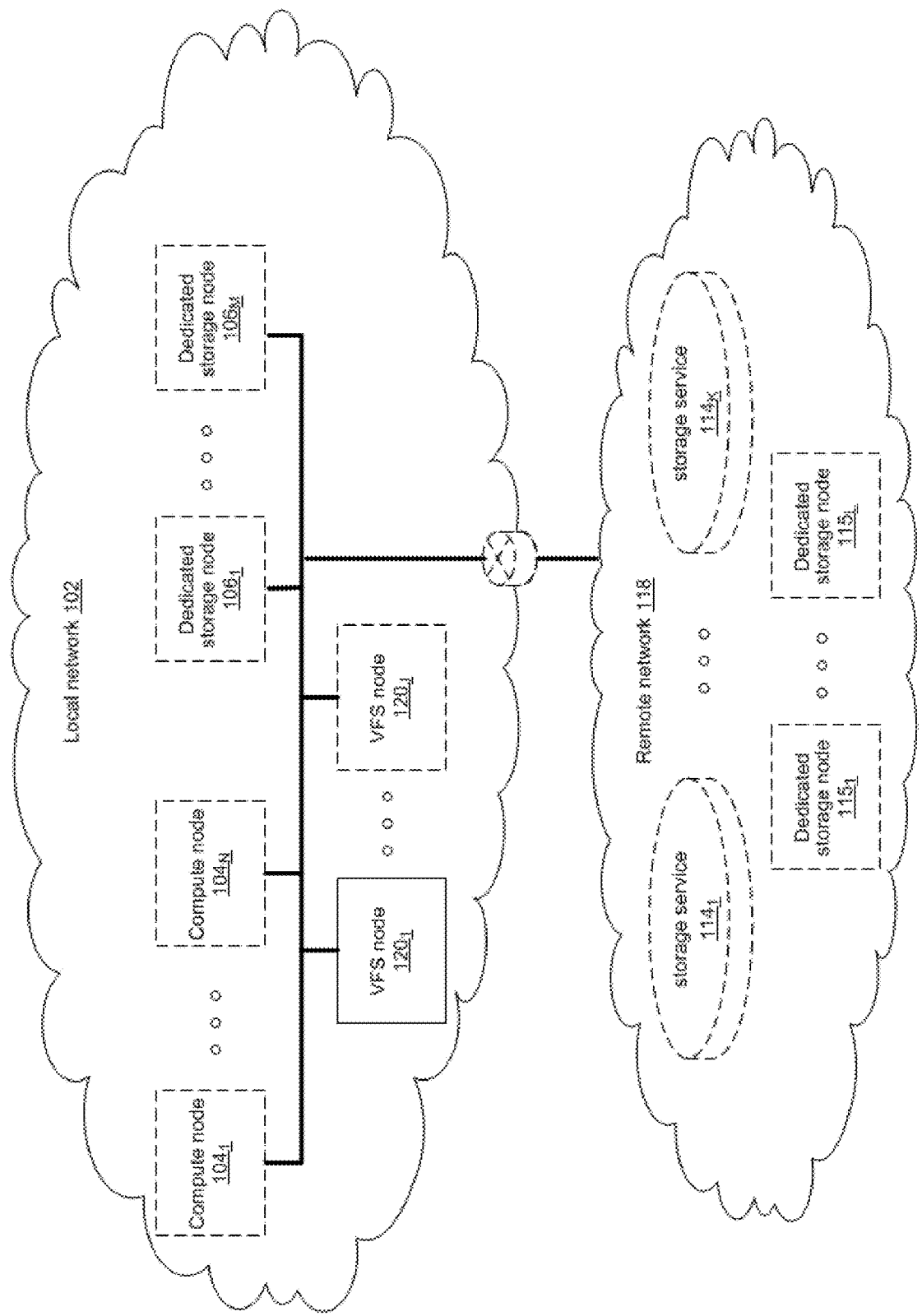
FIG. 1 illustrates various example configurations of a distributed file system in accordance with aspects of this disclosure.

FIG. 1 illustrates various example configurations of a distributed file system in accordance with aspects of this disclosure. Shown in FIG. 1 is a local area network (LAN) 102 comprising one or more nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1).

Each node $120_j$ (j an integer, where 1≤j≤1) is a networked computing device (e.g., a server, personal computer, or the like) that comprises circuitry for running processes (e.g., client processes) either directly on an operating system of the device $104_n$ and/or in one or more virtual machines running in the device $104_n$.

The compute nodes 104 are networked devices that may run a virtual frontend without a virtual backend. A compute node 104 may run a virtual frontend by taking a single root input/output virtualization (SR-IOV) into the network interface card (NIC) and consuming a complete processor core. Alternatively, the compute node 104 may run the virtual frontend by routing the networking through a Linux kernel networking stack and using kernel process scheduling, thus not having the requirement of a full core. This is useful if a user does not want to allocate a complete core for the file system or if the networking hardware is incompatible with the file system requirements.

Figure 2:
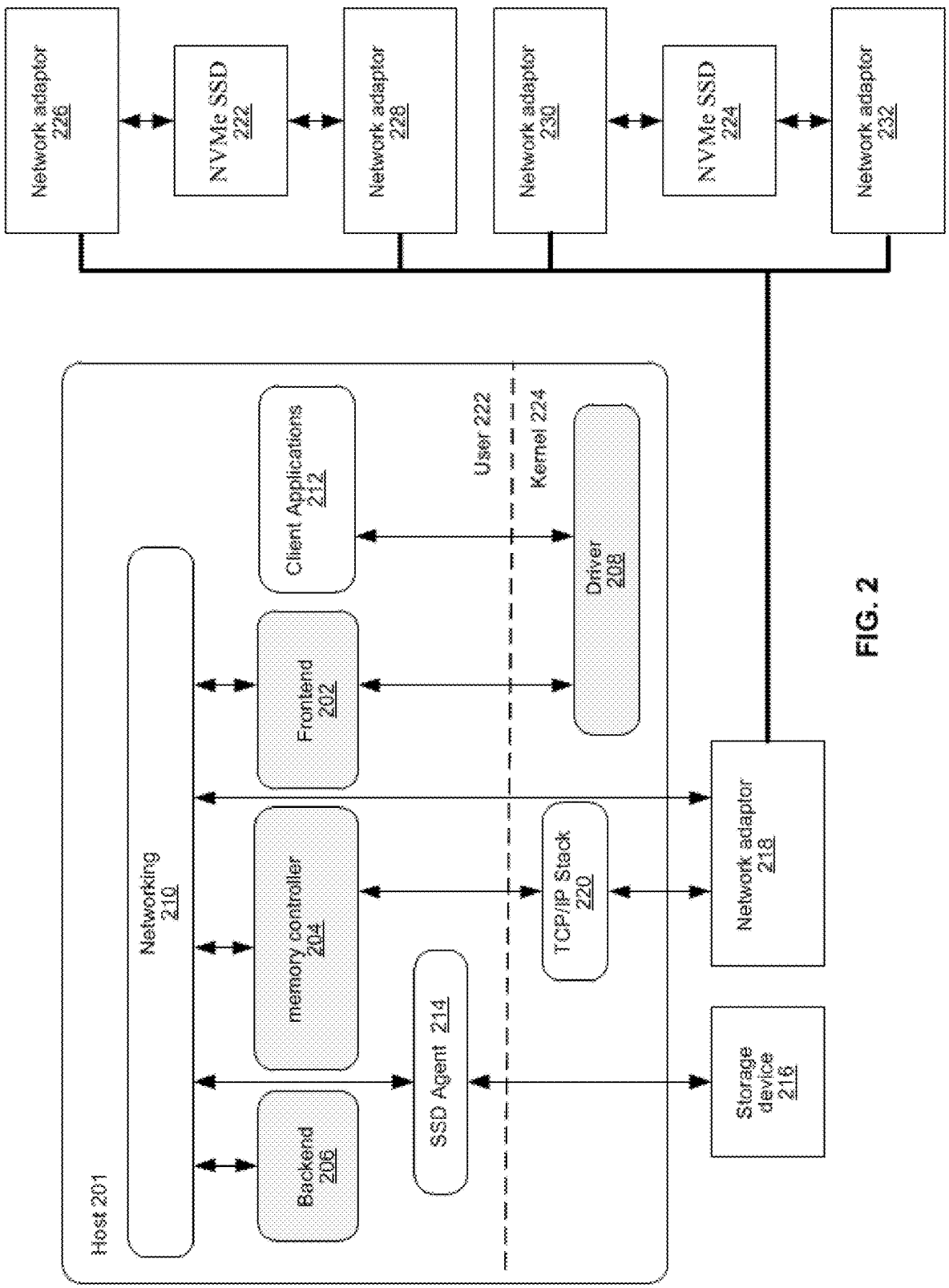
FIG. 2 illustrates an example configuration of a distributed file system node in accordance with aspects of this disclosure.

FIG. 2 illustrates an example configuration of a node in accordance with aspects of this disclosure. A node comprises a frontend 202 and driver 208, a memory controller 204, a backend 206, and an SSD agent 214. The frontend 202 may be a virtual frontend; the memory controller 204 may be a virtual memory controller; the backend 206 may be a virtual backend; and the driver 208 may be a virtual drivers. As used in this disclosure, a virtual file system (VFS) process is a process that implements one or more of: the frontend 202, the memory controller 204, the backend 206, and the SSD agent 214. Thus, in an example implementation, resources (e.g., processing and memory resources) of the node may be shared among client processes and VFS processes. The processes of the VFS may be configured to demand relatively small amounts of the resources to minimize the impact on the performance of the client applications. The frontend 202, the memory controller 204, and/or the backend 206 and/or the SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The node may be serviced by an operating system and/or a virtual machine monitor (VMM) (e.g., a hypervisor). The VMM may be used to create and run the node on a host 201. Multiple cores may reside inside the single LXC container running the VFS, and the VFS may run on a single host 201 using a single Linux kernel. Therefore, a single host 201 may comprise multiple frontends 202, multiple memory controllers 204, multiple backends 206, and/or one or more drivers 208. A driver 208 may run in kernel space outside the scope of the LXC container.

A SR-IOV PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage media 216 attached via a PCI Express (PCIe) bus. The non-volatile storage media 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 222 or 224 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 222 and 224 to transform them into networked NVMe-oF devices without the use of a server. The NVMe SSDs 222 and 224 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by sharding the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

A VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

A VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual file system. The SSD agent 214 could also communicate with a standard network storage device supporting a standard protocol such as NVMe-oF (NVMe over Fabrics).

Figure 3:
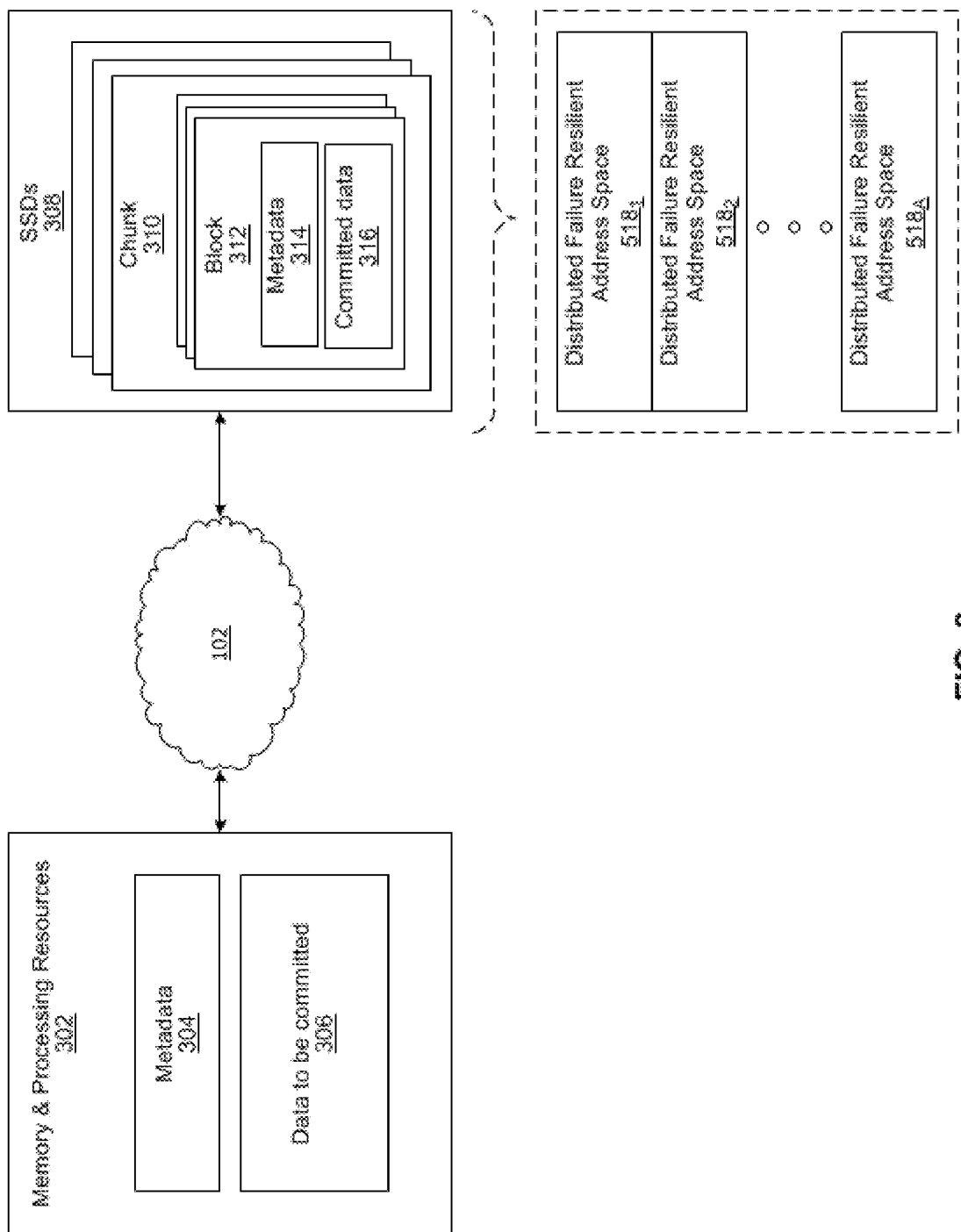
FIG. 3 illustrates another representation of a distributed file system in accordance with an example implementation of this disclosure.

FIG. 3 illustrates another representation of a distributed file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2 above. The element 308 represents the one or more physical storage devices 216 which provide the long term storage of the virtual file system.

As shown in FIG. 3, the physical storage is organized into a plurality of distributed failure resilient address spaces (DFRASs) 518. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re]assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire file system metadata space (e.g., directory, file attributes, content range in the file, etc.) can be broken (e.g., chopped or sharded) into small, uniform pieces (e.g., "shards"). For example, a large system with 30 k servers could chop the metadata space into 128 k or 256 k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8 k buckets.

Each bucket may be active on a small set of nodes, typically 5 nodes that form a penta-group for that bucket. The cluster configuration keeps all participating nodes up-to-date regarding the penta-group assignment for each bucket.

Each penta-group monitors itself. For example, if the cluster has 10 k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000

$$\left(\frac{26!}{5!*(26-5)!}\right)$$

possible five-none groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the file system. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Since each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 518) and does not need to cooperate with other buckets to perform read or write operations. There are potentially thousands of concurrent, distributed erasure coding instances working concurrently, each for the different bucket. This is an integral part of scaling performance, as it effectively allows any large file system to be divided into independent pieces that do not need to be coordinated, thus providing high performance regardless of the scale.

Each bucket handles all the file systems operations that fall into its shard. For example, the directory structure, file attributes and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

Encrypted storage is important to many different applications. For example, finance application must be secured according to the Federal Information Processing Standard (FIPS), and healthcare applications must be secured according to the Health Insurance Portability and Accountability Act (HIPPA).

Encryption may be required for stored data. For example, if one or more storage devices are compromised, encryption of the stored data prevents the recovery of clear text data.

Encryption may also be required "on-the-fly" for data that is transmitted over a network. For example, encryption on the "on-the-fly" prevents eavesdropping and a man-in-the-middle trying to meddle with the data.

Figure 4:
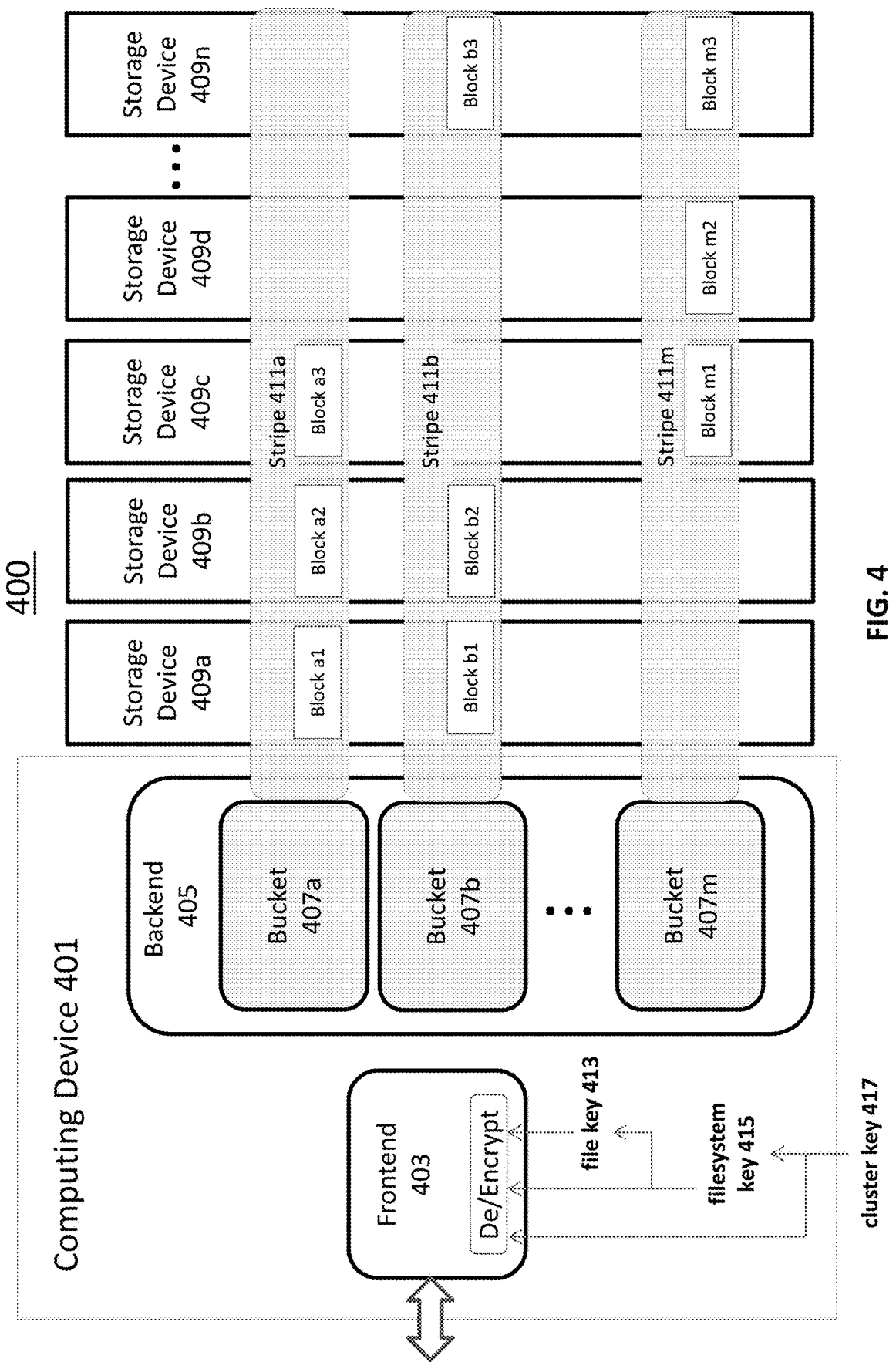
FIG. 4 illustrates an example of a computing device in an encrypted file system in accordance with one or more embodiments of the present disclosure.

FIG. 4 illustrates an example of a computing device 401 in an encrypted file system 400. The computing device comprising a frontend 403 and a backend 405. The frontend 403 may encrypt and decrypt data on the client side as it enters and leaves the system. The frontend 403 is operable to encrypt data as it is written to a data file in the system 400. The frontend 403 is also operable to decrypt data as it is read from a data file in the system 400.

The frontend 403 encrypts the data at least according to a file key 413. This file key 413 may be rotated by copying the data file. The file key 413 (e.g., one key per file) may be provided to a client for frontend encryption and decryption. This file key 413 may be generated by the file system 401 with a FIPS-approved secure random number generator. If the file key 413 is to be saved, the file key 415 may be encrypted by a file system key 415. Additionally, the file system id and the inode id may be used as authenticated data for the file key 413. File keys can be rotated by copying the file. When the file is copied, the contents will be re-encrypted with a newly generated file key.

The file system key 415 (e.g., one key per each file system) should never leave the file system's boundaries. The file system key 415 may be generated by a key management system/server (KMS). If the file system key 415 is to be saved, the file system key may be encrypted by a cluster key 417. Additionally, the cluster id and the file system id may be used as authenticated data for the file system key 415. The file system key 415 may be rotated instantly by the file system 400. For example, the file system 400 may request that the KMS generates a new key for a specified file system. Newly created files will have their file key 413 encrypted with the latest file system key 415, and updated files may have their file key 413 re-encrypted with the latest file system key 415.

The file key 413 may be encrypted by a file system key 415. Furthermore, the file system key 415 may be encrypted by a cluster key 417. The file key 413 may be re-encrypted when the file system key 415 is rotated, and the file system key 415 may be re-encrypted when the cluster key 417 is rotated.

The backend comprises a plurality of buckets 407a, 407b . . . 407m. The computing device 401 is operably coupled to a plurality of storage devices 409a, 409b, 409c, 409d . . . 407n, e.g. SSD's. The number of buckets may the less than, greater than or equal to the number of storage devices.

Each bucket 407x of the plurality of buckets 407a, 407b . . . 407m is operable build a failure-protected stripe 411x that comprises a plurality of storage blocks (e.g., block x1, block x2 and block x3). The plurality of storage blocks comprises encrypted data as well as error detection and/or error correction coding. For illustration, stripe 411a comprises block a1, block a2 and block a3; stripe 411b comprises block 131, block b2 and block b3; and stripe 411c comprises block c1, block c2 and block c3. The number of blocks in a stripe may be less than, greater than or equal to three. Each storage block of a particular stripe is located in a different storage device of the plurality of storage devices. All failure-protected stripes 411 built by the plurality of buckets 407 in the backend 405 are in a common file system 400 associated with the file system key 415.

Figure 5:
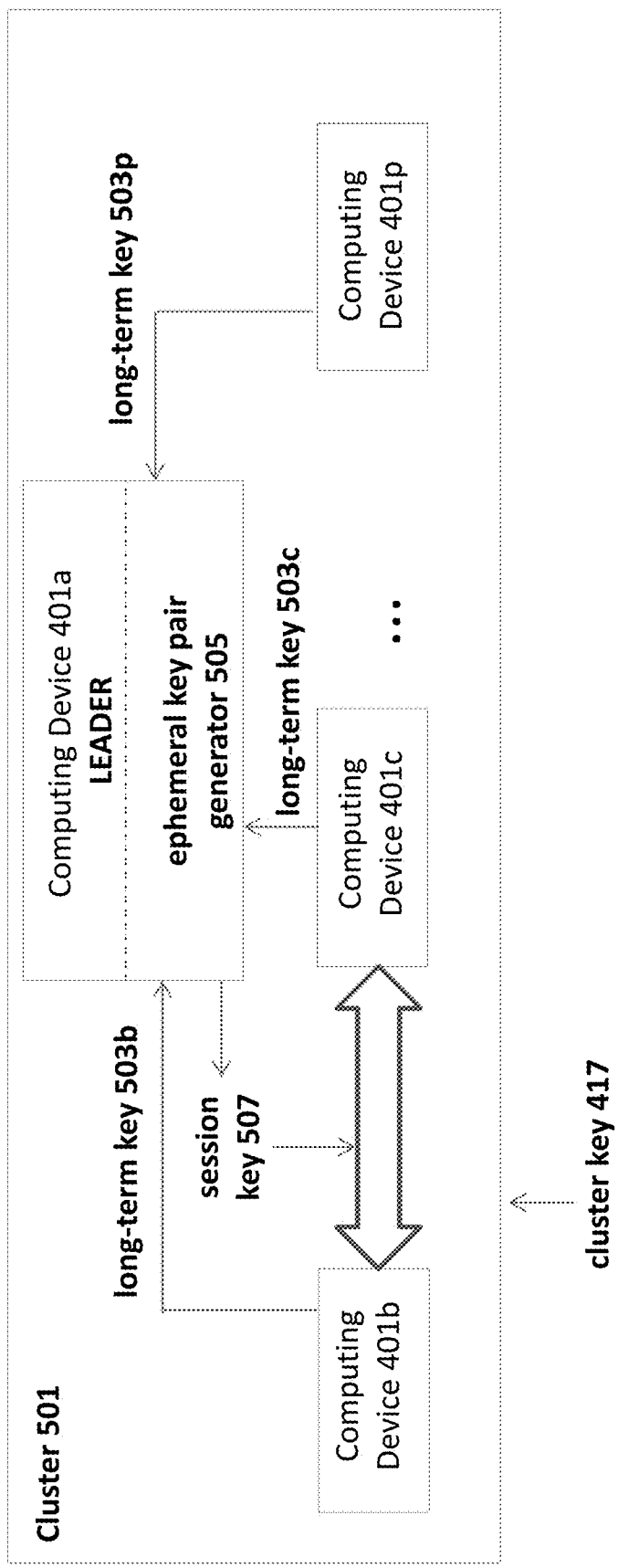
FIG. 5 illustrates an example of a cluster of computing devices in accordance with one or more embodiments of the present disclosure.

FIG. 5 illustrates an example of a cluster 501 of computing devices 401a, 401b, 401c . . . 401p. The cluster 501 of computing devices is associated with the cluster key 417. The cluster key 417 (e.g., one key per each cluster) should never leave the cluster's boundaries. The cluster key 417 may be generated by a KMS. The cluster key can be rotated instantly by the KMS. Upon rotation, the KMS re-encrypts each file system key 415, and the old cluster key can be destroyed. A file system does not need to be aware of the rotation. When a client (e.g., computing device 401b or 401c) joins the cluster 501, it registers a public key 503 with the leader. Each client node generates a long-term public/private key pair 503 on startup.

Network-encryption keys may be negotiated by two nodes (e.g., computing device 401b or 401c) for encrypting communication between those two nodes. Network interactions between nodes, including system nodes and client nodes, are called remote procedure calls (RPCs). RPCs can mark their arguments, output parameters and return value as encrypted. RPCs may encrypt their argument payloads using a pre-negotiated key known only to the two RPC endpoints (e.g., nodes). On-demand, each client may negotiate a session key 507 with each system node it connects to. Session keys may be negotiated with perfect forward security using ephemeral key pairs (using. e.g., ephemeral key pair generator 505) signed with the long-term key pairs (e.g., long-term key 503b and 503c) that are generated by each node (e.g., computing device 401b or 401c) when it was added to the cluster 501.

System-to-system keys may be used to reduce the time until a newly-started server can connect to other servers. Upon joining, the newly-started server may receive a key from the file system leader. This system-to-system key is encrypted and saved in a configuration. RPCs from servers to ServerA may use a configuration denoted as, for example, "config.serverkeys [A]."

To authenticate a client, an administrator may generate a token or certificate that can be used by clients to join the cluster. The token may be time-limited and configurable, by an administrator, based on a challenge-response mechanism. The token may identify a specific machine (e.g., my IP address or instance ID). The token may identify a client class, thereby allowing many machines to join using the same token. The token may also be revoked by the administrator. When a token is revoked, new clients will not be able to join using the token, and an existing client that joined using the token will be disconnected unless the existing client has an updated and valid token.

To authorize mounts, an administrator can configure which clients (either specific machines or groups of machines) may mount which file systems. This authorization is verified when a client attempts to mount the file system. A client that has not mounted the file system may be prevented from accessing the file system. The administrator may specify whether the allowed access is read only, write only or read/write. The administrator may also allow a client to mount as root (e.g., rootsquash or no rootsquash).

Each file system may have a filename-encryption key that may be derived from the file system key. When a client mounts a file system, the client may receive a filename-encryption key. The client may create files with encrypted filenames using symmetric encryption.

File data in object storage (e.g., tiered data for backups and restores) may be encrypted the same way as on-disk data. When uploading to the object storage, the file data may contain file system parameters such as the encrypted file system key. For example, the file system key may be encrypted with a special "backup-specific cluster key" that is available via a KMS.

If a cluster is discarded and a new cluster is created by downloading a file system from the object store, the downloaded file system may be decrypted by the file system key with the backup-specific key and re-encrypted with the cluster's new cluster key.

When stowing a snapshot to a simple storage service (S3) the file system keys may be re-encrypted using a new cluster key. The "stow" command may contain the new cluster key ID and credentials to access it from the KMS. The existing file system keys may be re-encrypted with the new cluster key and saved in the S3 with the rest of the file system metadata. Restoring a stowed snapshot requires accessing the same cluster-key specified when stowing.

System page cache may be encrypted to reduce the possibility that memory (e.g., kernel memory) will be accessed by another process. To combat this unauthorized access, encrypted data received by a kernel page cache may not be decrypted immediately once it is received in the network. Because the kernel will store encrypted data, a rogue application would be unable to access to it. When the process that actually own the files accesses the encrypted data, the kernel driver, with the help of the frontend, will decrypt the data while copying it to the memory space of that process. System memory will, therefore, be encrypted until it is accessed legitimately.

The encryption and decryption processes may leverage hardware acceleration. When performing the encryption, the file system may look for hardware that is capable of accelerating the encryption process. The file system may rank which hardware is more efficient (e.g., standard CPU opcodes, acceleration within the CPU, encryption co-processor on the, or a network card) and use the most efficient way of encrypting the decrypting the data.

Self-encrypting drives (SED) may be used in addition to the aforementioned encryption. On top of the standard encryption code in the file system, an SED may encrypt the already encrypted data that is being received.

Encryption at of stored data may use symmetric encryption keys, where the same key is used for encrypting and decrypting the data. Based on the file system configuration, there are several options for key management.

The same key may be used for all the drives (e.g., SSD's). If that key is compromised, however, all of the drives can be read.

A different key may be used for each SSD. These keys may be managed by the file system randomly picking and storing the different encryption keys for each SSD. Alternatively, these keys may be managed by a client's own key management system that handles creating and storing encryption keys. The file system may authenticate these key with the client's KSM and request the right key for each SSD. Until the next reboot the SSD holds the key and can use it.

Figure 6:
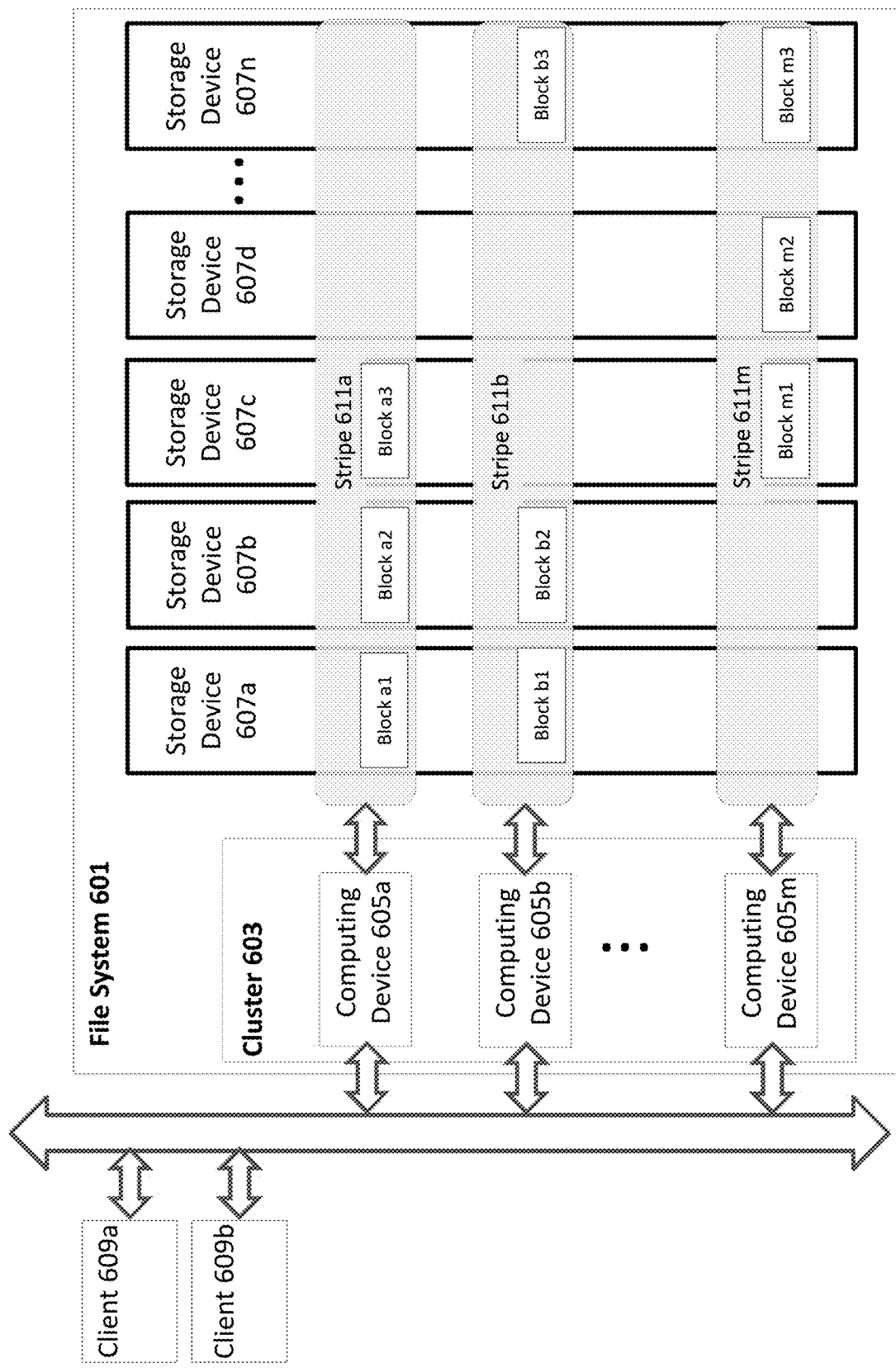
FIG. 6 illustrates an example a file system in accordance with one or more embodiments of the present disclosure.

FIG. 6 illustrates an example of a file system 601 in accordance with one or more embodiments of the present disclosure. The file system 601 comprises a plurality of storage devices 607a, 607b, 607c, 607d . . . 607n and a cluster of one or more computing devices 605a, 605b . . . 605m. Each computing device (e.g., 605a, 605b . . . 605m) of the cluster is operable to build one or more failure-protected stripes (e.g., 611a, 611b . . . 611m). Each failure-protected stripe (e.g., 611a, 611b and 611m) comprises a plurality of storage blocks (e.g., block a1, a2 and a3; block 131, b2 and b3; and block m1, m2 and m3). Each storage block (e.g., block a1, a2 and a3) of a failure-protected stripe (e.g., 611a) is located in a different storage device (e.g., 607a, 607b and 607c) of the plurality of storage devices (e.g., 607a, 607b, 607c, 607d . . . 607n).

A client 609a is operable to request access to at least a portion of the file system 601 via a stateless mount string. The stateless mount string may comprise data that is encrypted by a cryptographically-signed key. The stateless mount string may also encapsulate one or more authentication parameters, such as object storage stateless credentials and/or quality of service parameters.

To authenticate a client, an administrator may request that the file system generates a cryptographically-signed key that can be used by a particular client to access a limited portion of the file system domain. Authorization of the client may be verified according to the cryptographically-signed key when a client attempts to access the file system. An unauthorized client will be prevented from accessing the file system.

Access to a portion of the file system 601 may be granted independently of previous requests (or other communication) by the client. Multiple clients 609a and 609b may access the file system 601 concurrently. Multiple clients 609a and 609b may be mapped to a common user identification number. The cryptographically-signed key may prevent a client from accessing portions of the file system. For example, a first client 609a may access a first portion of the file system, and a second client 609b may access a second portion of the file system. The first portion of the file system may or may not overlap with the second portion of the file system.

The cryptographically-signed key may also have the ability to limit access based on timing specified. For example, a client may be granted access for a portion of the namespace for a week. After that week is elapsed, access is no longer granted. Alternatively, write access may changes to read access after that week. If the client wants to continue accessing the namespace, a new cryptographically-signed key will need to be generated on the system by the administrator, and the new cryptographically-signed key will need to be provided to the client.

The client will then either re-mount (un-mount, and mount, easy but clunky) or actually enage in a mode that a overlapped mount starts with the new credentials, pass everything to it transparently then remove the old mount that is going to lose access soon.

The stateless mount string brings the object storage stateless credentials parameters to the mount options capability. By utilizing stateless mount strings, client nodes may be added to a large cluster, while only users with permissions can actually access different portions of that file system with the correct quality of service (QoS) parameters. QoS parameters may allow multiple concurrent mounts, and each mount may be associated with a priority or permission.

The stateless mount string may incorporate (Lightweight Directory Access Protocol) LDAP to locate particular storage portions and/or computing devices in the file system. For example, the encapsulated QoS parameters may be associated local permissions. The file system may maintain an access control list (ACL) that specifies which clients are granted access to particular objects, as well as what operations are allowed on given objects.

Figure 7:
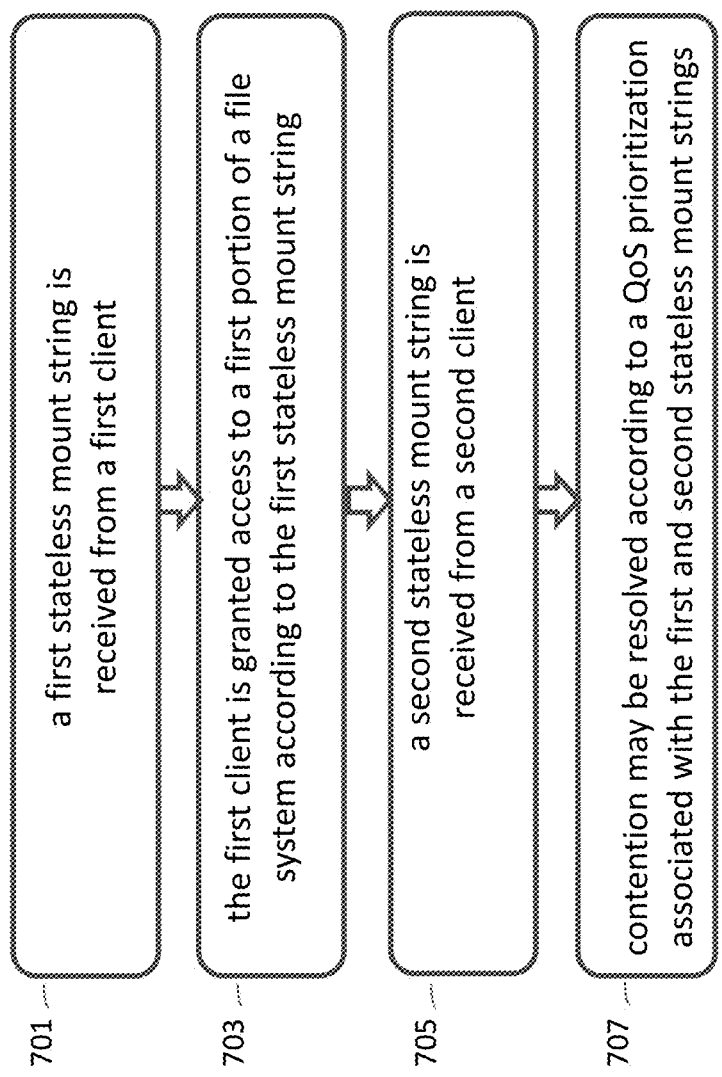
FIG. 7 is a flowchart illustrating an example method for accessing a file system in accordance with one or more embodiments of the present disclosure.

FIG. 7 is a flowchart illustrating an example method for accessing a file system in accordance with one or more embodiments of the present disclosure. In block 701, a first stateless mount string is received from a first client. In block 703, the first client is granted access to a first portion of a file system according to the first stateless mount string. The access to the first portion of the file system is independent of any request prior to the first stateless mount string. In block 705, a second stateless mount string is received from a second client. In block 707, the second client is granted access to a second portion of a file system according to the second stateless mount string. The first client and the second client may access the file system concurrently.

If the first portion of a file system overlaps with a second portion of a file system, contention may be resolved according to a QoS prioritization in block 707. For example, the second client may be prevented from accessing the first portion of the file system if the second stateless mount string is associated with a lower priority than the first stateless mount string.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A file system comprising:
    a cluster of one or more computing devices; and
    a plurality of storage devices, wherein:
        each computing device of the cluster is operable to build one or more failure-protected stripes,
        each failure-protected stripe comprises a plurality of storage blocks,
        each storage block of a failure-protected stripe is located in a different storage device of the plurality of storage devices, and
        a first client other than the one or more computing devices of the cluster is operable to request access to a first portion of the file system via a first stateless mount string.

2. The system of claim 1, wherein access to the first portion of the file system is granted independently of any previous requests by the first client.

3. The system of claim 1, wherein a second client other than the one or more computing devices of the cluster is operable to request access to a second portion of the file system via a second stateless mount string, wherein the first client and the second client are operable to access the file system concurrently.

4. The system of claim 3, wherein the first client and the second client are mapped to a common user identification number.

5. The system of claim 3, wherein the second client is prevented from accessing the first portion of the file system.

6. The system of claim 1, wherein the first stateless mount string is encrypted by a cryptographically-signed key.

7. The system of claim 6, wherein the first stateless mount string comprises data encrypted by the cryptographically-signed key.

8. The system of claim 1, wherein the stateless mount string encapsulates one or more authentication parameters.

9. The system of claim 8, wherein the one or more authentication parameters comprise object storage stateless credentials.

10. The system of claim 8, wherein the one or more authentication parameters comprise a quality of service parameter.

11. A method comprising:
receiving a first stateless mount string from a first client; and
granting the first client access to a first portion of a file system according to the first stateless mount string, wherein:
the file system comprises a plurality of storage devices and a cluster of one or more computing devices other than the first client,
each computing device of the cluster is operable to build a failure-protected stripe that comprises a plurality of storage blocks, and
each storage block of a failure-protected stripe is located in a different storage device of the plurality of storage devices.

12. The method of claim 11, wherein the access to the first portion of the file system is independent of any request prior to the first stateless mount string.

13. The method of claim 11, wherein the method comprises:
receiving a second stateless mount string from a second client; and
granting the second client access to a second portion of a file system according to the second stateless mount string, wherein the first client and the second client are operable to access the file system concurrently.

14. The method of claim 13, wherein the method comprises mapping the first client and the second client to a common user identification number.

15. The method of claim 13, wherein the method comprises preventing the second client from accessing the first portion of the file system.

16. The method of claim 11, wherein the method comprises decrypting the first stateless mount string using a cryptographically-signed key.

17. The method of claim 16, wherein the first stateless mount string comprises data encrypted by the cryptographically-signed key.

18. The method of claim 11, wherein the stateless mount string encapsulates one or more authentication parameters.

19. The system of claim 18, wherein the one or more authentication parameters comprise object storage stateless credentials.

20. The system of claim 18, wherein the one or more authentication parameters comprise a quality of service parameter.

* * * * *